US010697556B2

(12) United States Patent
Hill et al.

(10) Patent No.: US 10,697,556 B2
(45) Date of Patent: Jun. 30, 2020

(54) BOLTLESS GUIDED SLIDE VALVE

(71) Applicant: TapcoEnpro, LLC, Channelview, TX (US)

(72) Inventors: Jason Fiske Hill, Pearland, TX (US); Jeremy Lynn Meadows, Kingwood, TX (US); Robert Keith Stoddard, Jr., Kingwood, TX (US)

(73) Assignee: TapcoEnpro, LLC, Channelview, TX (US)

( * ) Notice: Subject to any disclaimer, the term of this patent is extended or adjusted under 35 U.S.C. 154(b) by 101 days.

(21) Appl. No.: 15/640,012

(22) Filed: Jun. 30, 2017

(65) Prior Publication Data
US 2018/0328512 A1    Nov. 15, 2018

Related U.S. Application Data

(60) Provisional application No. 62/503,928, filed on May 9, 2017.

(51) Int. Cl.
*F16K 3/00* (2006.01)
*F16K 27/10* (2006.01)
*F16K 3/02* (2006.01)
*F16K 3/316* (2006.01)
*F16K 25/04* (2006.01)
*F16K 27/04* (2006.01)
*F16K 41/04* (2006.01)

(52) U.S. Cl.
CPC .......... *F16K 27/105* (2013.01); *F16K 3/0218* (2013.01); *F16K 3/0227* (2013.01); *F16K 3/0272* (2013.01); *F16K 3/316* (2013.01); *F16K 25/04* (2013.01); *F16K 27/044* (2013.01); *F16K 41/04* (2013.01)

(58) Field of Classification Search
CPC ........ F16K 3/0218; F16K 3/0272; F16K 3/16; F16K 3/316; F16K 27/044; F16K 27/105
See application file for complete search history.

(56) References Cited

U.S. PATENT DOCUMENTS

| | | | | |
|---|---|---|---|---|
| 3,964,507 | A * | 6/1976 | Jandrasi | F16K 3/0263 137/375 |
| 4,458,879 | A * | 7/1984 | Jandrasi | F16K 3/316 137/375 |
| 4,512,363 | A * | 4/1985 | Jandrasi | F16K 3/0218 137/375 |

(Continued)

*Primary Examiner* — Reinaldo Sanchez-Medina
(74) *Attorney, Agent, or Firm* — Michael F. Krieger; Kirton McConkie

(57) ABSTRACT

The sliding parts, the guides and interlocking portions of the interlocking guides and slides of a slide valve are all disposed away from a flow path through the valve. Additionally, the portions of the interlocking guide on the slide or disc of the valve that interlock with the guide on an orifice plate are connected to the slide or disc by welds instead of bolts, greatly increasing durability. As the slide or disc moves in and out to control the flow rate precisely, the guides of the slide or disc move with it. Because the sliding surfaces of the orifice plate and the slide or disc are outside of the flow path, they are consequently not subjected to erosion from the flow through the valve. Accordingly, all critical sliding surfaces are not exposed to the flow path and are greatly increased in durability.

20 Claims, 11 Drawing Sheets

(56) References Cited

U.S. PATENT DOCUMENTS

| | | | | |
|---|---|---|---|---|
| 5,301,712 A * | 4/1994 | Treichel | ............... | F16K 3/0263 |
| | | | | 137/315.32 |
| 5,732,930 A * | 3/1998 | Fritz, Jr. | ............... | F16K 3/0218 |
| | | | | 251/326 |
| 6,050,288 A * | 4/2000 | Junier | ................. | F16K 3/0263 |
| | | | | 137/315.27 |
| 6,354,324 B1 * | 3/2002 | Junier | ................... | F16K 27/044 |
| | | | | 137/315.27 |
| 8,181,935 B2 * | 5/2012 | Haberhauffe | .......... | F16K 3/316 |
| | | | | 251/118 |

* cited by examiner

BOLTLESS GUIDED SLIDE VALVE

CROSS-REFERENCE TO RELATED APPLICATIONS

This application claims the benefit of U.S. Provisional Application No. 62/503,928, filed May 18, 2017.

BACKGROUND OF THE INVENTION

1. Field of the Invention

The present invention relates to slide valves for fluidized catalytic cracking units and other fluidized solids moving systems, and more particularly to boltless slide valves for such use.

2. Background and Related Art

Slide valves utilized in controlling high temperature and high velocity flow of products through the valve (e.g., in fluidized catalytic cracking units) have a number of disadvantages. For example, they often require seat plates and seat plate bolting and have seat plate distortion. The utilization of bolting that is under load due to differential pressure in the valves is only as strong as the bolting system strength. The resulting seat plate distortion causes a lack of a positive seal against bypass from differential pressure, does not allow for proper alignment of the orifice plate, and does not provide for future expansion of the port opening.

Additionally, current valves for fluidized catalytic cracking units advantageously have removable internal parts for periodic servicing. Such parts are made removable because it is often such parts that are subject to or are prone to wear during use of the valve. The installation and removal of such parts, however, is traditionally by bolting. Accordingly, such removable internal parts suffer from the deficiencies discussed above. Thus, although current valves have improved upon past valves to the point where fluid catalytic cracking units used in refineries have gone to being serviced annually or more frequently to a point where they can operate without shutdown for servicing for five years, improvements are still necessary.

Efforts have been made to minimize wear of guide elements for slide valves used for fluidized catalytic cracking units and similar fluidized solids moving systems. In such systems, such as that disclosed in U.S. Pat. No. 3,976,094 to Jandrasi et al., guides and slides for the slide valve are located out of the direct flow path through the valve, such that the passage of high-temperature fluidized solids through the valve does not directly impact the slide valve guides and slides, reducing the possibility of wear of the guides and slides and surfaces thereof, thereby reducing wear-related distortion and loss of positive seal against bypass.

More recently, U.S. Pat. No. 8,181,935 has been issued to Haberhauffe et al., attempting to address similar issues with respect to reducing wear of guides and slides for the slide valve by placing such guides and slides outside of the direct flow path through the valve. This patent is largely similar to the Jandrasi U.S. Pat. No. 3,976,094 patent, and does not provide a benefit over the teachings of the Jandrasi patent, as both systems dispose their guides and slides outside of the flow path in a similar manner but retain similar deficiencies. Indeed, the valves of both of these patents continue to suffer from utilization of bolting of the guides and/or slide elements to the slide plate and/or valve itself, whereby the entire system strength can only be as strong as the associated bolting system such that even though guide and slide wear is reduced in light of being placed outside the flow path, seat plate distortion and lack of a positive seal against bypass remain issues for such systems.

Thus, in refineries and solids handling systems, there remains a need for a slide valve that can operate in high-pressure, high-temperature erosive solid or fluid flow systems. The valve should be of low relative cost, should have readily removable wear-prone components, and should have non-changing clearances without the necessity of removing the valve from the line. At the same time, the valve should be capable of long use without requiring servicing. Currently available valves do not address these needs.

BRIEF SUMMARY OF THE INVENTION

The sliding parts, the guides and interlocking portions of the interlocking guides and slides of a slide valve are all disposed away from a flow path through the valve. Additionally, the portions of the interlocking guide on the slide or disc of the valve that interlock with the guide on an orifice plate are connected to the slide or disc by welds instead of bolts, greatly increasing durability while still minimizing wear of guides and slides or other guiding elements. As the slide or disc moves in and out to control the flow rate precisely, the guides of the slide or disc move with it. Because the sliding surfaces of the orifice plate and the slide or disc are outside of the flow path, they are consequently not subjected to erosion from the flow through the valve. Accordingly, all critical sliding surfaces are not exposed to the flow path and are greatly increased in durability, which durability is matched by the durability of the welded assembly.

BRIEF DESCRIPTION OF THE SEVERAL VIEWS OF THE DRAWINGS

The objects and features of the present invention will become more fully apparent from the following description and appended claims, taken in conjunction with the accompanying drawings. Understanding that these drawings depict only typical embodiments of the invention and are, therefore, not to be considered limiting of its scope, the invention will be described and explained with additional specificity and detail through the use of the accompanying drawings in which:

DETAILED DESCRIPTION OF THE INVENTION

A description of embodiments of the present invention will now be given with reference to the Figures. It is expected that the present invention may take many other forms and shapes, hence the following disclosure is intended to be illustrative and not limiting, and the scope of the invention should be determined by reference to the appended claims.

U.S. Pat. No. 3,976,094 to Jandrasi et al. discloses a guided slide valve and discusses features of such a valve that are generally relevant to the current boltless slide valve. The disclosure of that patent is incorporated herein by reference for all it discloses. As in the system disclosed in that patent, the sliding parts, the guides and interlocking portions of the sides and side members of the slide valve of embodiments of the current invention are all disposed away from the flow path. As the slide or disc moves in and out to control the flow rate precisely, the guides of the slide or disc move with it. Because the sliding surfaces of the orifice plate and the slide or disc are outside of the flow path, they are consequently not subjected to erosion from the flow of fluidized solids through the valve. Accordingly, all critical sliding surfaces are not exposed to the flow path and are greatly increased in durability.

Figure 1:
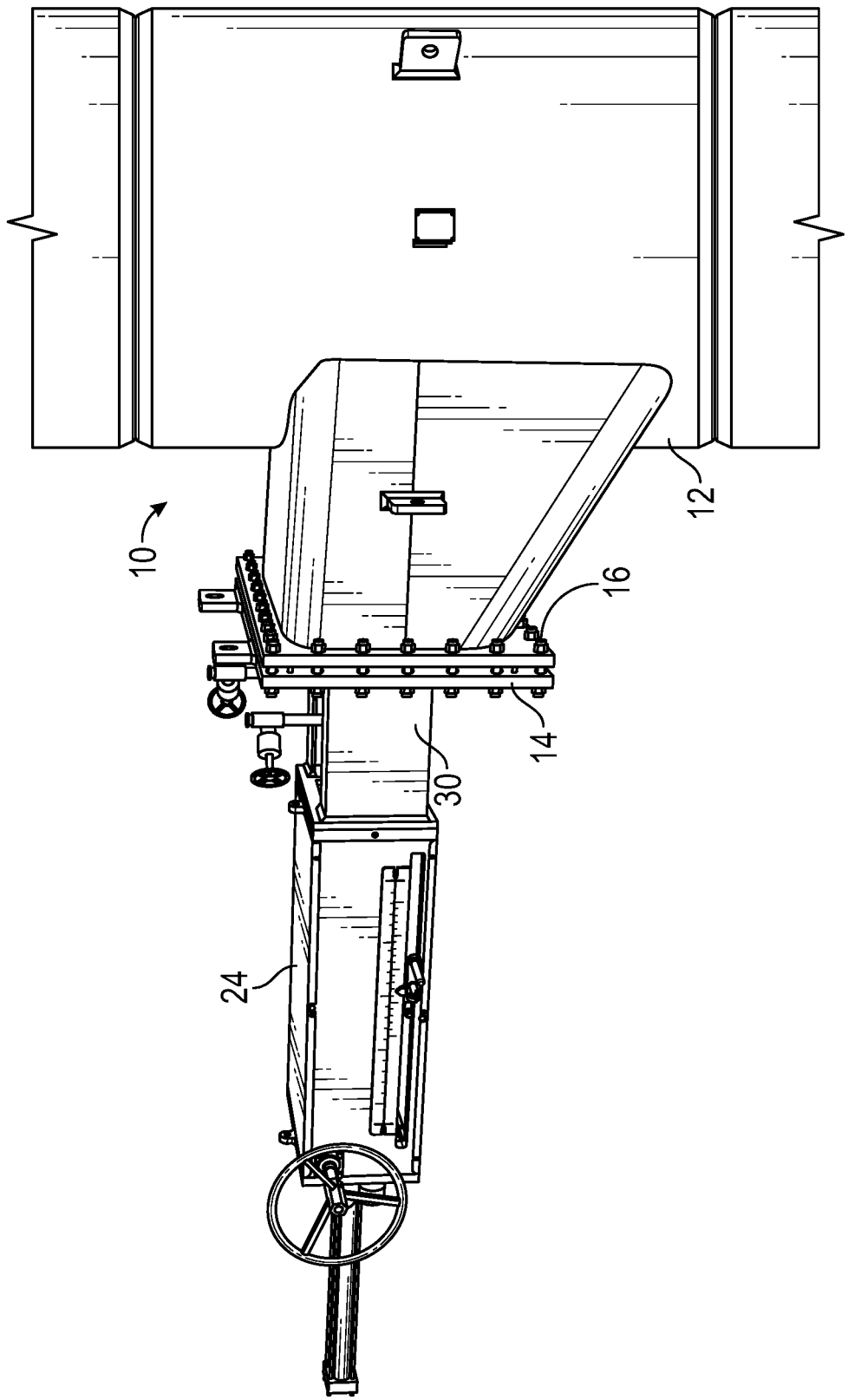
FIG. 1 shows a perspective view of a guided slide valve.
Figure 2:
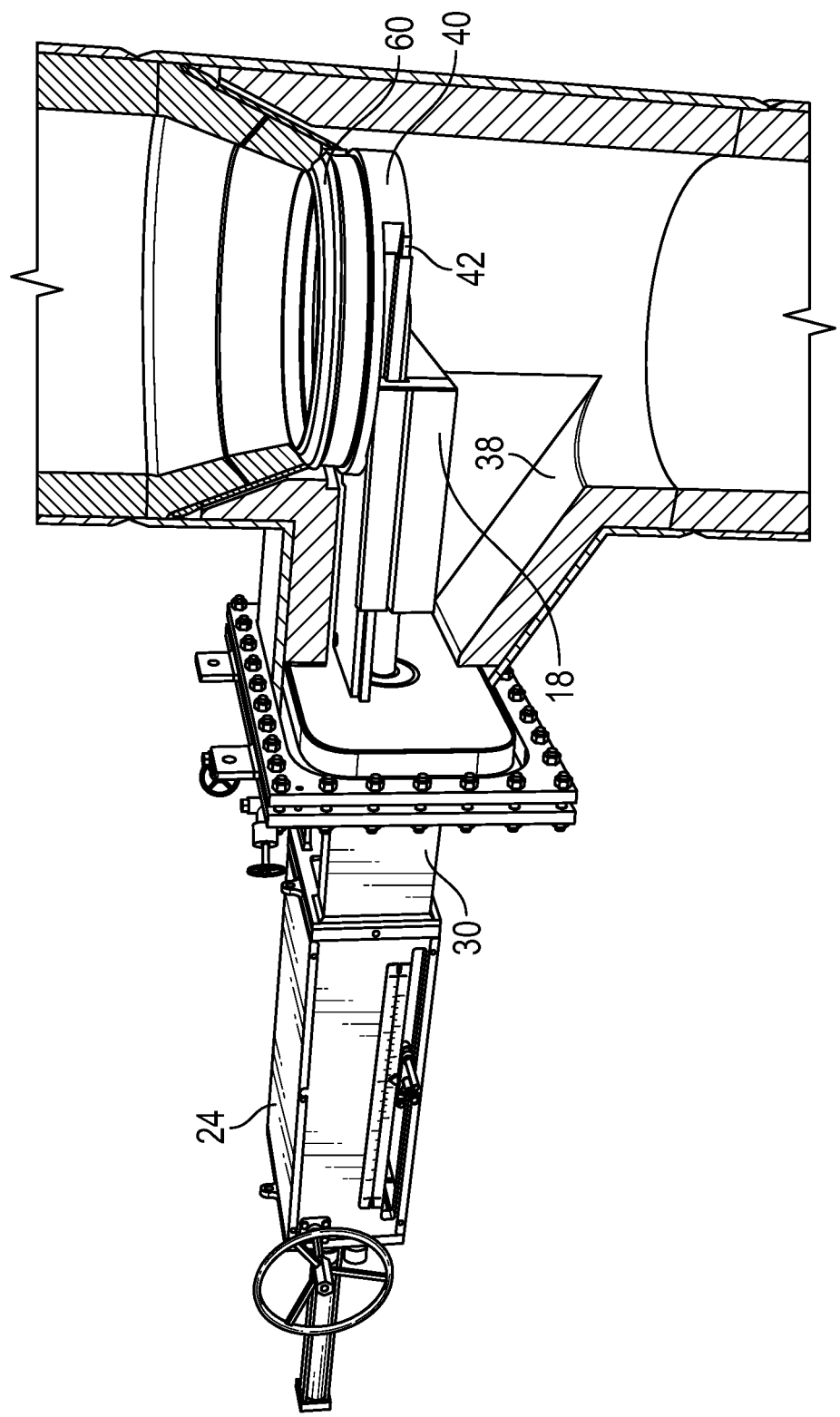
FIG. 2 shows a perspective partial-cutaway view of the guided slide valve of FIG. 1.
Figure 3:
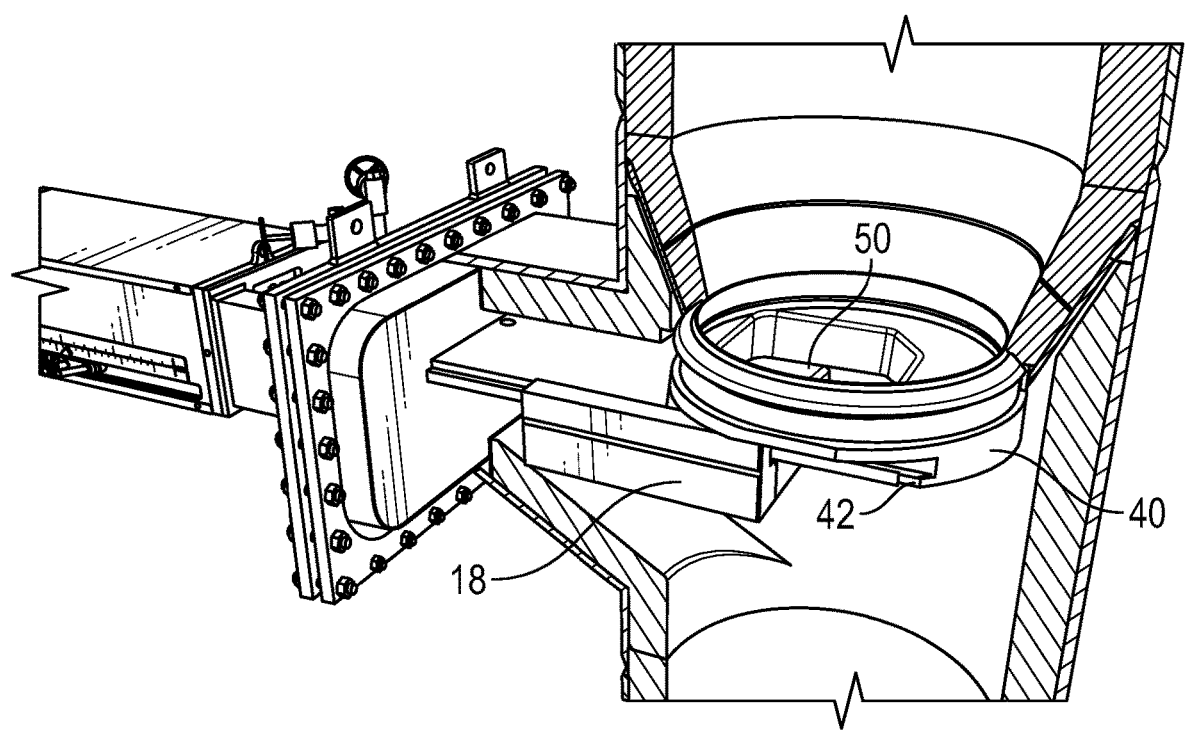
FIG. 3 shows a perspective partial-cutaway view of the guided slide valve of FIG. 1.

Referring now to the drawings, and particularly to FIG. 1, the reference numeral 10 generally designates the guided slide valve which includes the body 12 which is closed by the removable flanged bonnet or cover 14 bolted to the body flange 16. The bonnet or cover 14 is of a size large enough to allow the wear-prone valve internals to be inserted into and withdrawn from the valve body 12 when the bonnet or cover 14 is removed.

Figure 5:
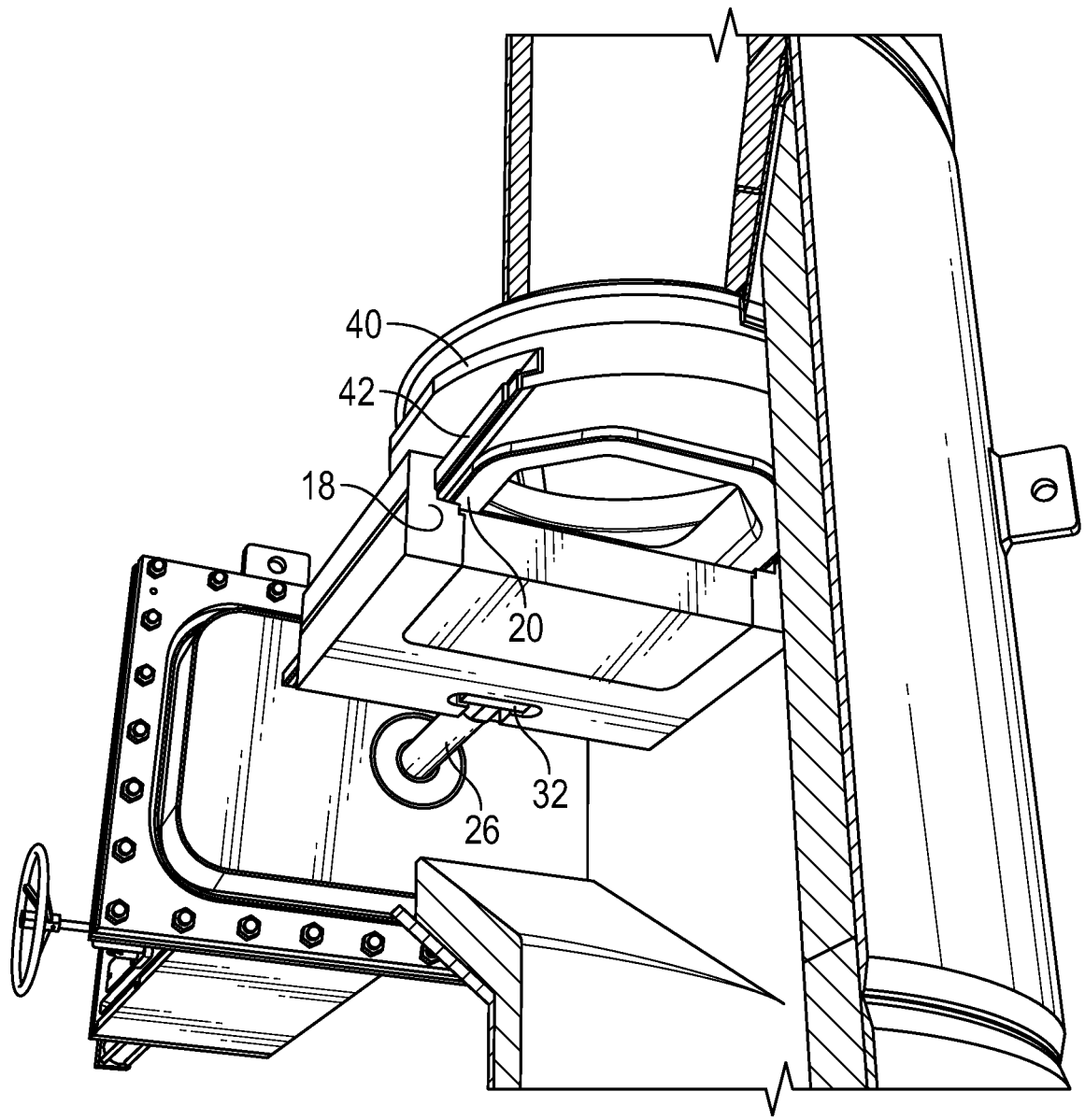
FIG. 5 shows a perspective partial-cutaway view of the guided slide valve of FIG. 1.
Figure 6:
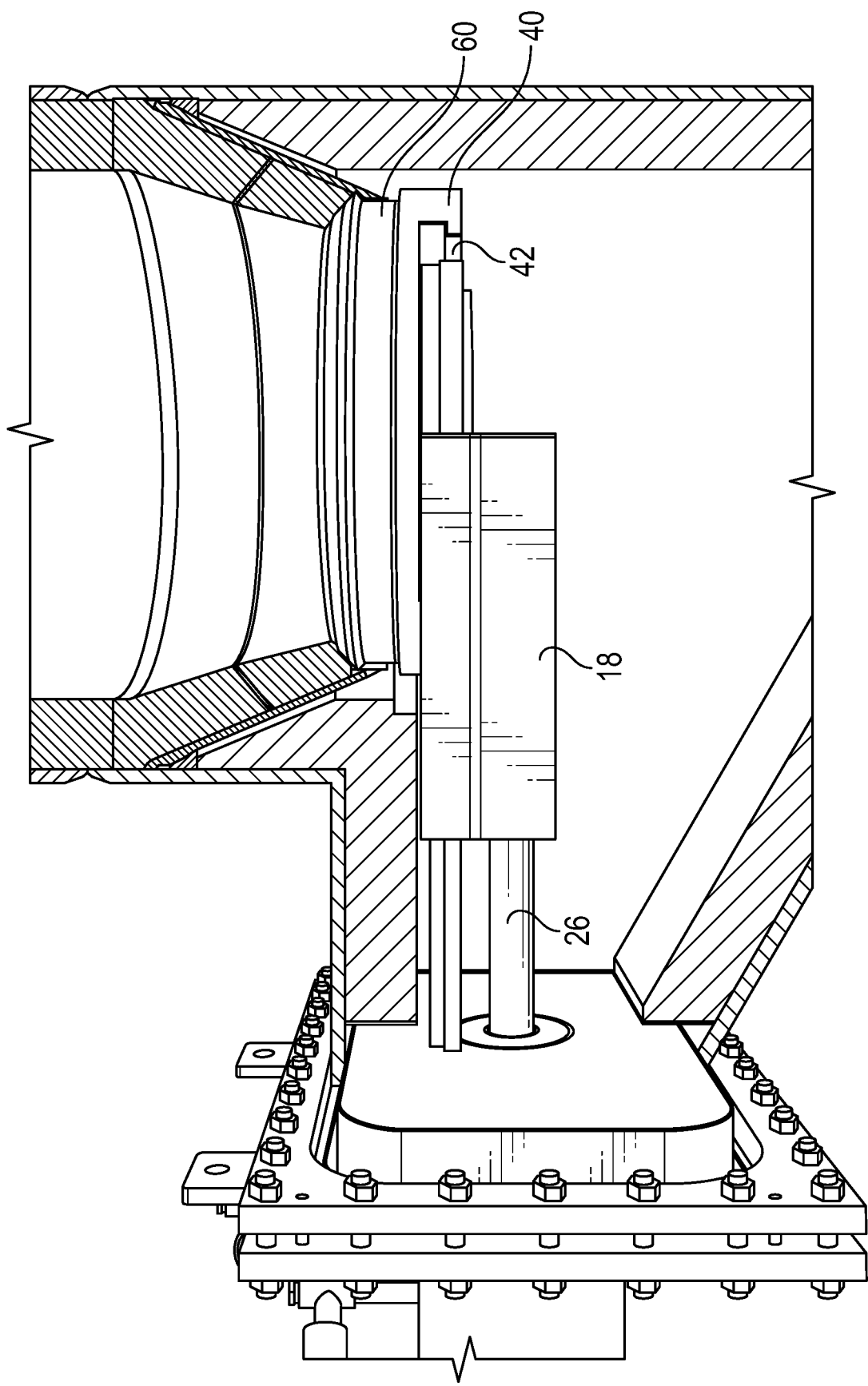
FIG. 6 shows a perspective partial-cutaway view of the guided slide valve of FIG. 1.
Figure 7:
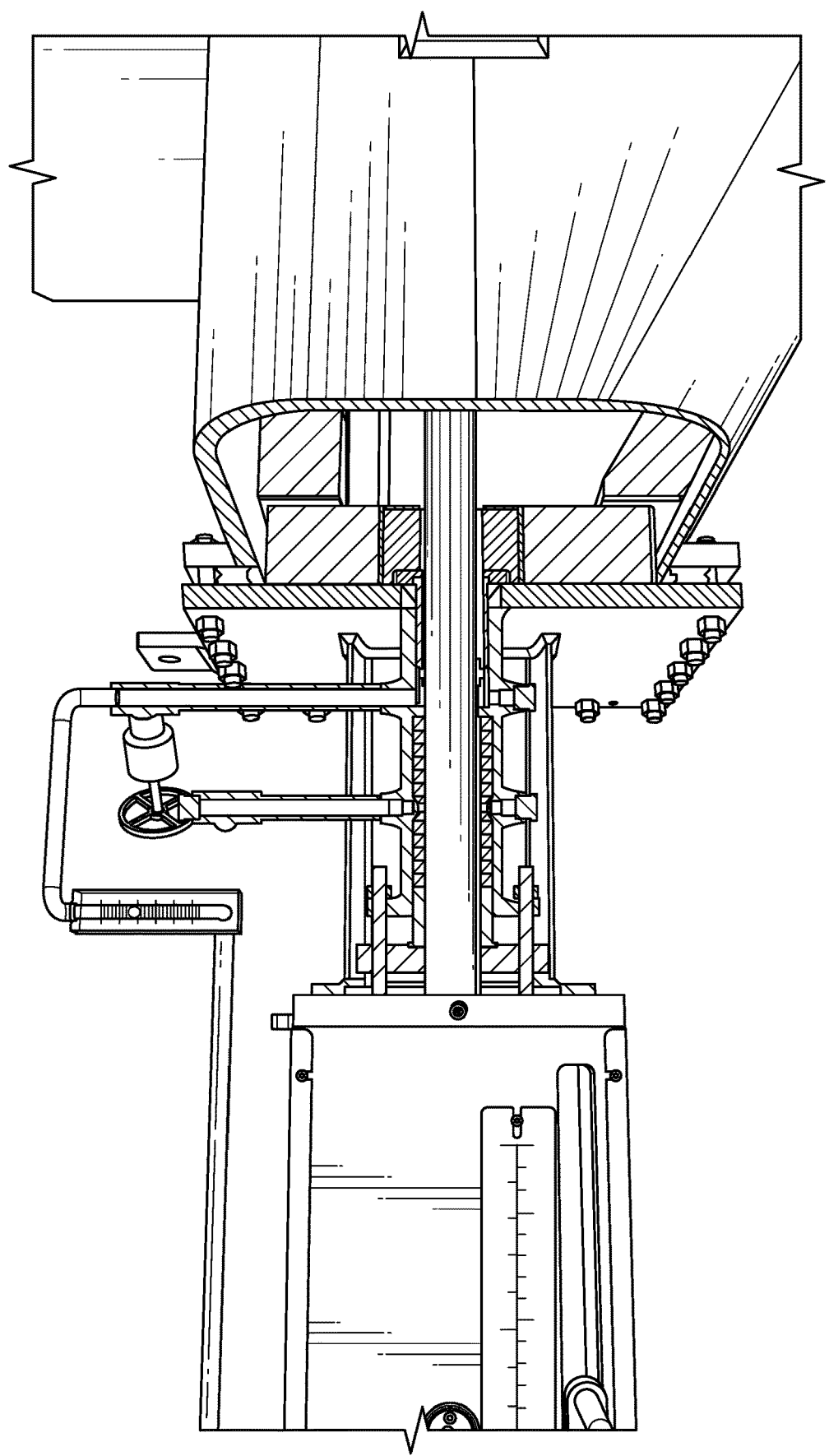
FIG. 7 shows a perspective partial-cutaway view of a purgeless stuffing box of the guided slide valve of FIG. 1.
Figure 8:
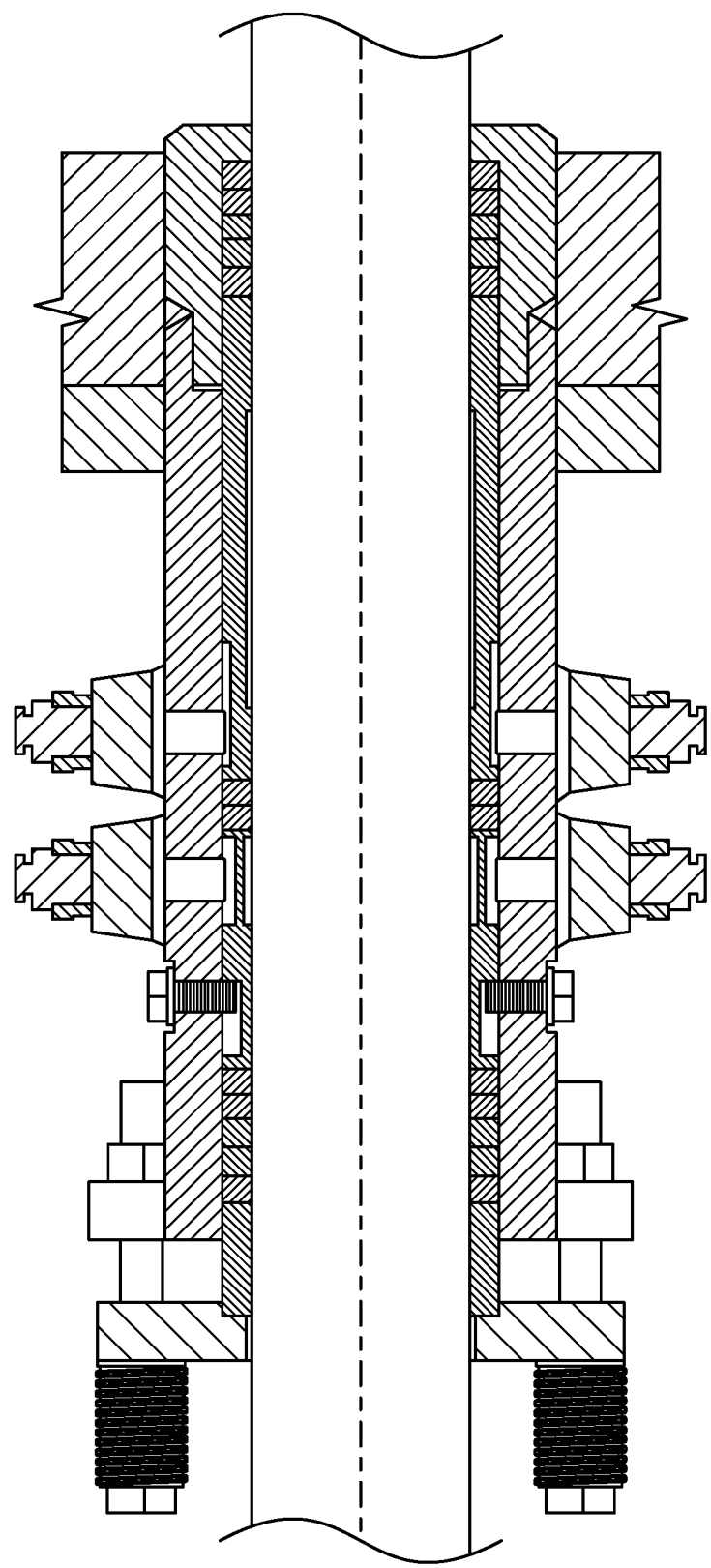
FIG. 8 shows a diagrammatic view of the purgeless stuffing box of FIG. 7.
Figure 9:
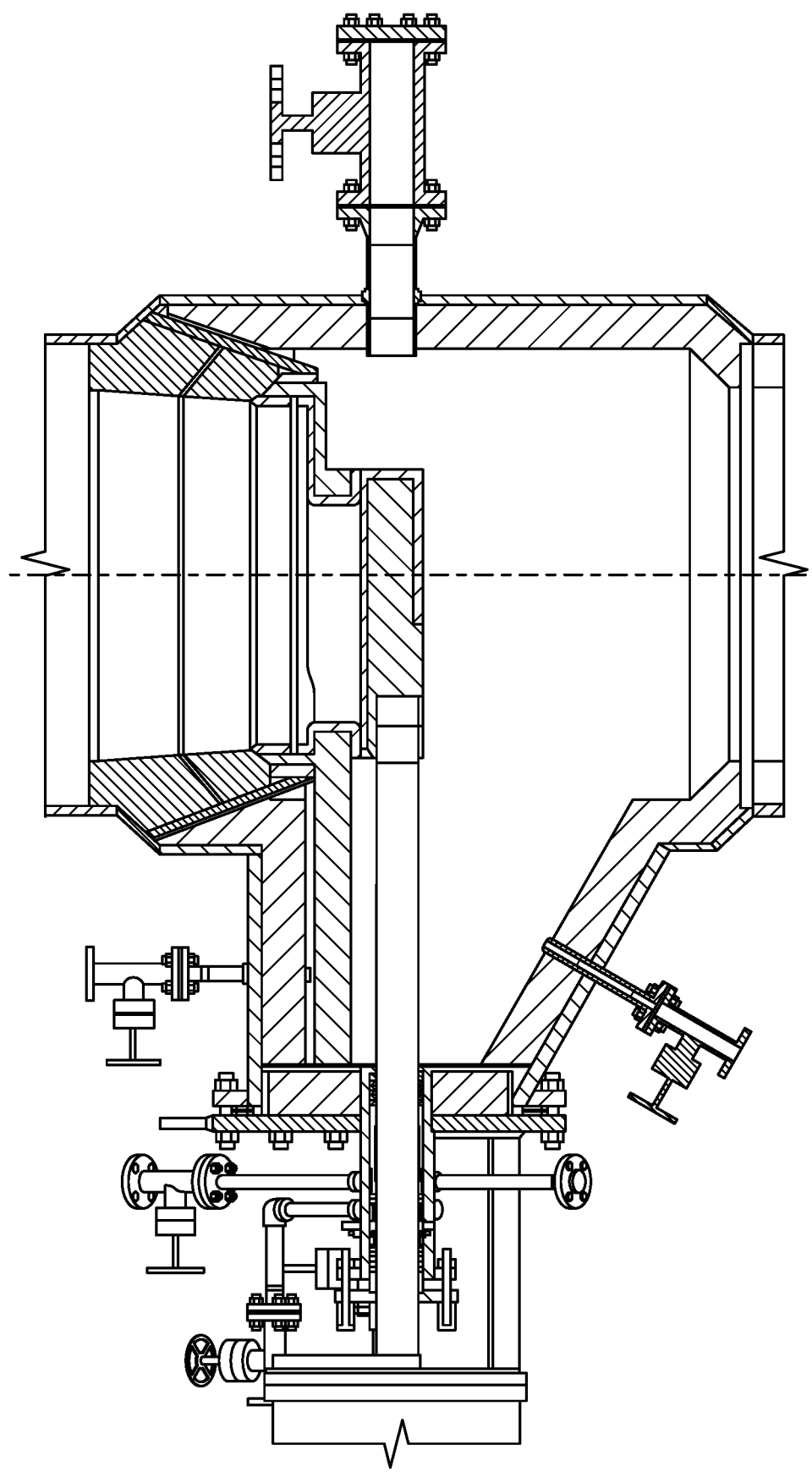
FIG. 9 shows a diagrammatic view of a portion of the guided slide valve of FIG. 1.

The valve body 12 generally defines a flow passage extending through the body 12. Accordingly, the valve 10 may be disposed in a line and be used to control flow through the line. Disposed within the valve body 12 is a slide or disk 18 and a valve surface or seat 20 (see FIG. 5). Sliding movement of the slide or disk 18 across the valve surface 20 opens and closes the flow passage extending through the valve body 12.

Any suitable means may be provided for sliding the slide or disk 18 into open and closed positions and intermediate positions; however, for refinery and other commercial operations, valves of the type of the valve of the present invention are often opened and closed remotely as part of valve systems. To this end, there is provided a control mechanism 24 having an actuator stem 26 which extends through a stuffing box 30 and is connected at 32 to the slide or disk 18 in the usual manner. Hydraulic or pneumatic pressure is provided through lines to cause a movement of the actuator stem 26 and thereby the slide or disc 18 for moving it into open and closed positions.

No more description is given or deemed necessary of the means illustrated for opening and closing the slide or disc 18 and the stuffing box 30 as any desired means may be utilized, manual, electric, hydraulic, pneumatic and the like, to open and close the valve 10.

Figure 4:
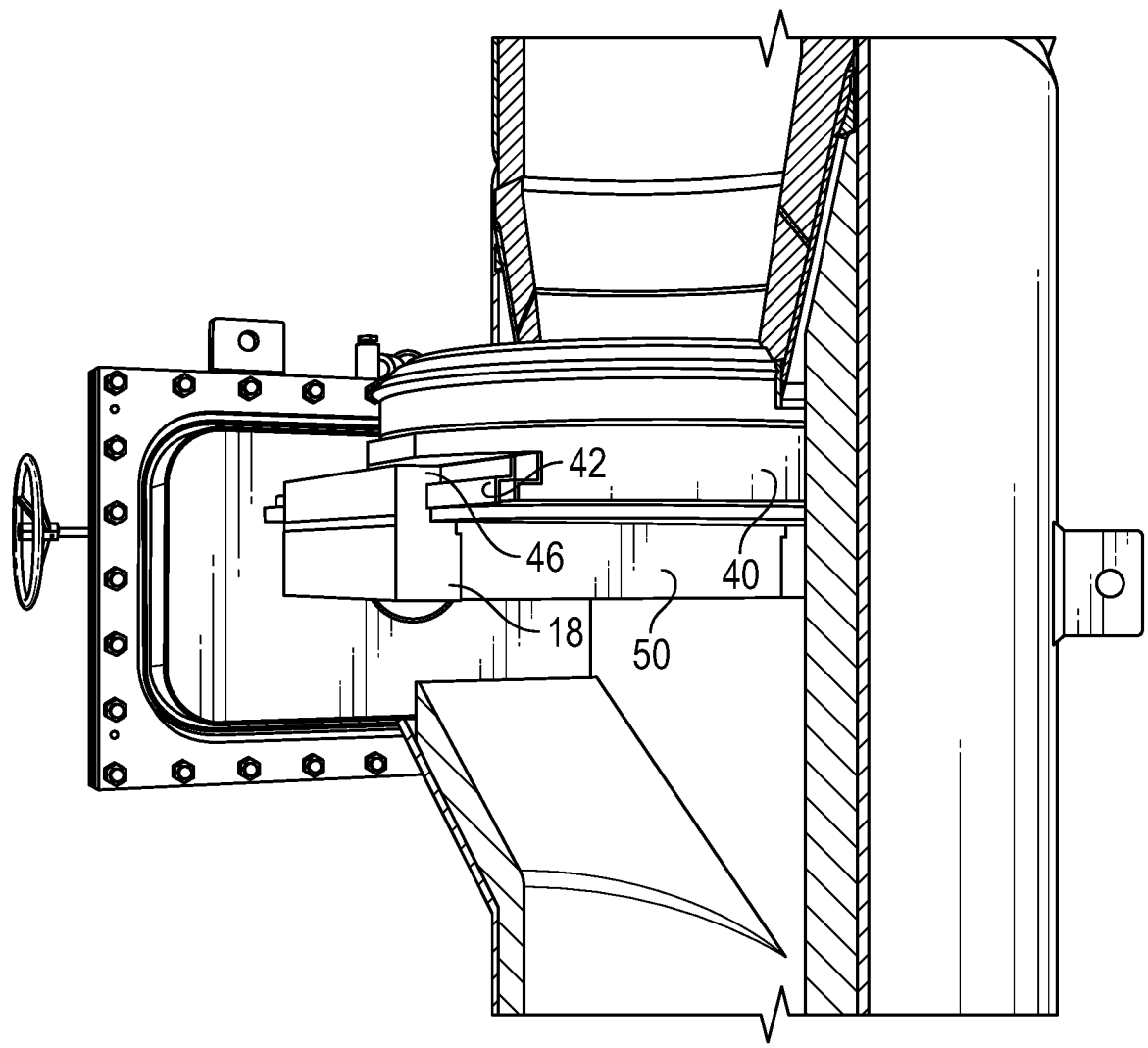
FIG. 4 shows a perspective partial-cutaway view of the guided slide valve of FIG. 1.

The flow passage extends through the valve body 12, as previously mentioned, which is provided with an enlarged internal portion 38 into which an orifice plate 40, which has the valve surface 20, projects. The orifice plate 40 provides transversely extending sides 42 spaced from the internal walls of the enlarged portion 38. The slide or disc 18 is slideable in this enlarged internal portion 38 adjacent the valve surface 20 and includes transversely-spaced side members 46 (best visible in FIG. 4 and in the enlarged view of FIG. 10) which extend or wrap around the sides 42 of the projecting orifice plate 40.

The interfitting transversely spaced pairs of guides and slides are operable for guiding the slide or disc 18 into open, closed, and intermediate positions adjacent the valve surface 20. The transversely extending sides are provided and are here illustrated as spaced parallel projections on opposite sides of the orifice plate 40 and interfitting grooves in the side members 46 of the slide or disc 18. Thus, the slide or disc 18 is guided throughout its movement by the interfitting sides 42 and side members 46 yet, at the same time, the sides 42 and side members 46 are disposed out of the direct flow path through the flow passage in the valve body 12.

As previously mentioned, the bonnet or cover 14 is of a size which permits insertion into and removal through the bonnet opening from the valve body of the slide or disc 18 and/or the orifice plate 40 for repair or replacement without removing the valve from the line.

If desired, of course, the grooves and projections of the sides 42 and side members 46 may be reversed, regardless, the sides 42 and side members 46 coact to provide clearances that remain fixed regardless of temperature or pressure excursions to the passage through the valve body 12.

A projecting body portion in the flow passage may be a part of a truncated cone which is suspended from the valve body 12 in a non-external load-bearing relation, such as by means of the internal annular body ledge and a bi-metallic weld. The body 12 includes an outer shell, which can be constructed of a low cost, low temperature material such as carbon steel and includes insulation which may be a castable insulation, many of which are available on the open market. A refractory layer is also included which preferably is a castable refractory layer formed of hexmesh and corrosion-resistant refractory material, many of which are commercially available, and which is spaced from the outer body shell by a series of T-shaped standoffs.

Similarly, a valve surface portion 50 of the slide or disc 18 cooperating with the valve surface 20 is also a refractory material, such as hexmesh and refractory, as is the inner wall member of the flow passage in order to withstand the high temperatures and erosion encountered in high pressure, high temperature, erosive, solid or fluid flow in refinery valves.

Also disposed in the passageway may be a pair of purge and lanceports for purging and cleaning out the flow passage through the valve body 12, which parts are normally closed by caps.

In some embodiments and as illustrated in the Figures, the sides 42 and side members 46 are hard-faced or lined with a hard material, such as Tapco 6, a commercial hardfacing, to provide wear resistant surfaces.

The slide or disc 18 of embodiments of the present invention, as well as the orifice plate 40 of embodiments of the present invention are secured in the valve body 12 without the use of bolts, as internal bolts are the weak link as to durability for existing slide valves. In particular, the orifice plate 40 is secured to the valve body (e.g., the cone) using a circumferential stub 60, as is disclosed in U.S. Pat. No. 6,050,288, which is incorporated herein by reference for all it discloses.

As disclosed in that patent, the internals of the slide valve 10 (the orifice plate with the circumferentially extending stub 60 welded to it, and the guide assembly for the slide or disc 18), are secured in the body 12, with the orifice plate circumferential stub 60 being connected by a weld assembly to an internal support cone which in turn is welded to the valve body 12. The orifice plate 40 and the guide assembly are welded together into a monolithic or unitary structure, or the guide assembly is supported by the orifice plate 40 by wrap around guides bolted or pinned to the orifice plate without the bolts or pins bearing any load. The internals, guide assembly, and orifice plate may be removed quickly and easily by cutting a welded connection of the weld assembly to the stub 60 and replaced by rewelding the stub 60 to the support cone. The circumferentially extending stub 60 can be welded either to the inside or outside of the internal end of the support cone. This permits high temperatures (1,000° F.+) and high pressure (50 psi+) transfer of product through the valve assembly.

Figure 10:
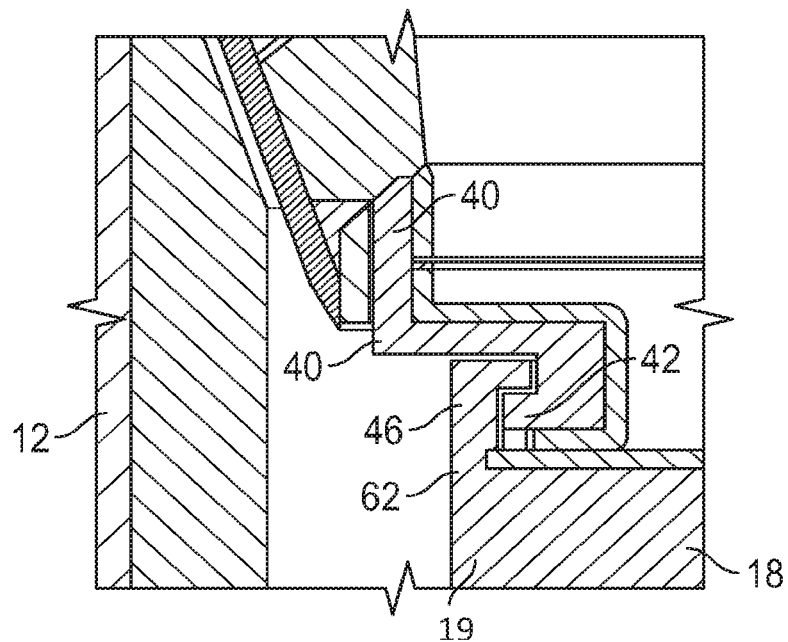
FIG. 10 shows a diagrammatic view of a guide and projection of the guided slide valve of FIG. 1.
Figure 11:
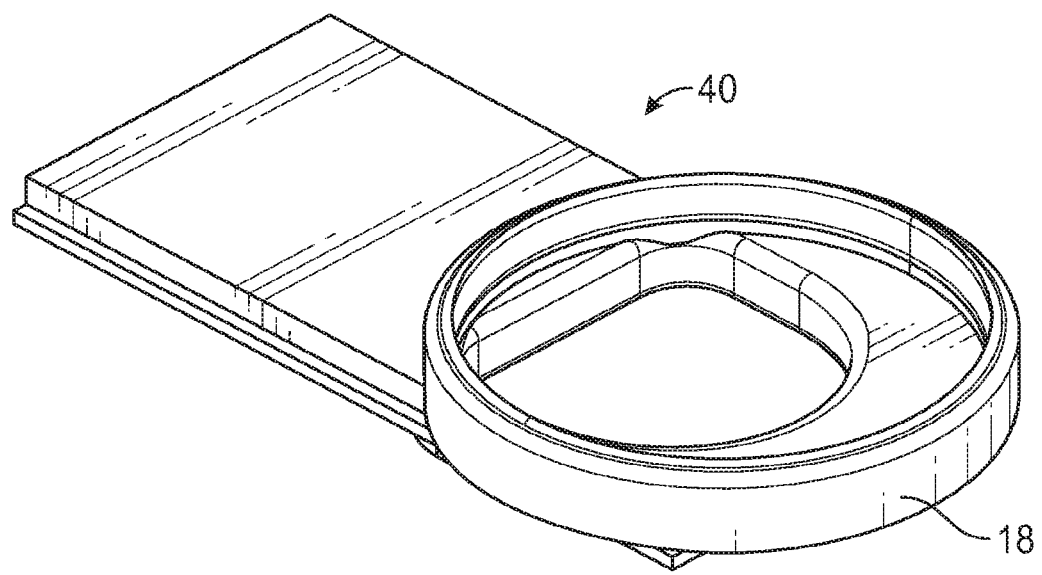
FIG. 11 shows a perspective view of an orifice plate of the guided slide valve of FIG. 1.
Figure 12:
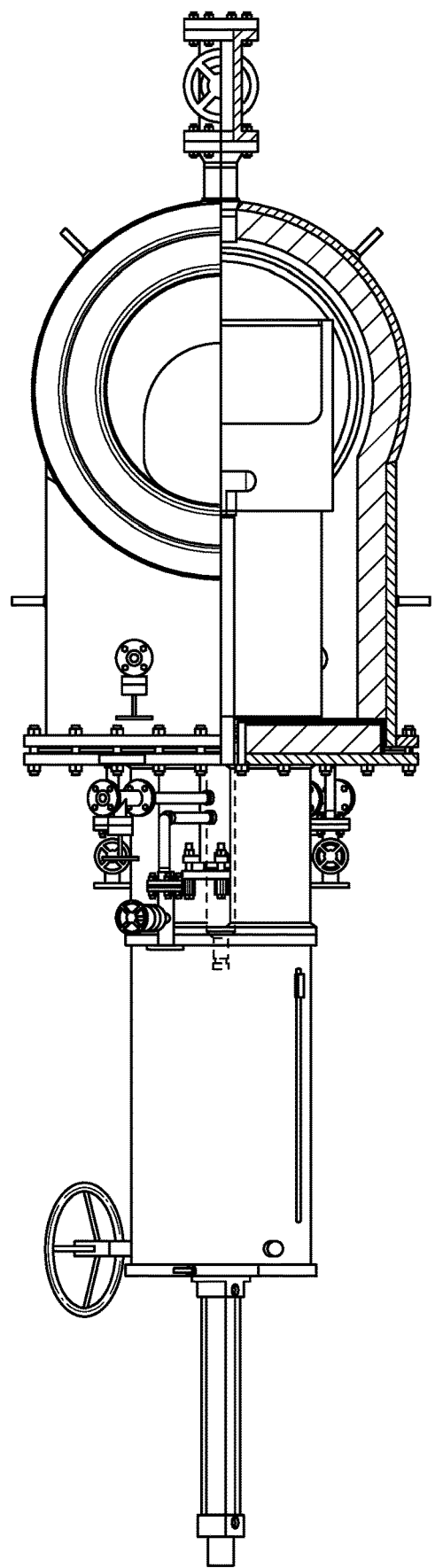
FIG. 12 shows a plan view and half section of a portion of the guided slide valve of FIG. 1.

In contrast to previous valves, the slide valve 10 also has no internal bolts securing the side members 42 to a body 19 of the slide or disc 18 (see FIG. 10). Instead, the side members 42 are welded to the body 19 of the slide or disc 18 at a point 62 where these two parts meet. This welded construction greatly increases the strength of the connection between the body 19 and the side members 42, such that the slide or disc 18 is much better able to withstand high loads and temperatures encountered during use of the valve 10. In this way, the service life of the valve 10 is increased, as is reliability of the valve 10.

The sliding parts, the guides and interlocking portions of the sides 42 and side members 46 are all disposed away from the flow path. As the slide or disc 18 moves in and out to control the flow rate precisely, the guides of the slide or disc 18 move with it. Because the sliding surfaces of the orifice plate 40 and the slide or disc 18 are outside of the flow path, they are consequently not subjected to erosion from the flow of fluidized solids through the valve 10. Accordingly, all critical sliding surfaces are not exposed to the flow path and are greatly increased in durability.

The present invention may be embodied in other specific forms without departing from its spirit or essential characteristics. The described embodiments are to be considered in all respects only as illustrative and not restrictive. The scope of the invention is, therefore, indicated by the appended claims, rather than by the foregoing description. All changes which come within the meaning and range of equivalency of the claims are to be embraced within their scope.

What is claimed is:

1. A guided slide valve comprising: a body provided with a flow passage therethrough, including an enlarged internal portion; a body portion connected at one end to the body and having a projecting body portion comprising side members extending into the enlarged internal portion, the projecting body portion having the entirety of its side members spaced from internal walls of the enlarged internal portion thereby forming a transverse space on each side of the projecting body portion out of direct flow through the flow passage; a valve seat secured on the projecting body portion; a slide or disc slidable in the enlarged internal portion adjacent the valve seat and having side members forming guides extending around the side members of the projecting body portion and disposed in the transverse space, the side members of the slide or disc being welded to a slide or disc body of the slide or disc; interfitting guides of the slide or disc and side members of the projecting body portion being operable for guiding the slide or disc into open and closed positions adjacent the valve seat; the guides being disposed in the transverse space and engaged on the side members of the projecting body portion; whereby the side members of the projecting body portion and the guides of the slide or disc being out of direct contact with the body thereby permit external settable clearances between the valve seat and the slide or disc which remain fixed under temperature or pressure excursions; the body provided with an opening of a size permitting insertion in and withdrawal from the body of the valve seat, the projecting body portion and its side members and the slide or disc therethrough; and a removable cover closing the opening.

2. The guided slide valve of claim 1, wherein the transverse space, the side members of the projecting body portion, and the guides of the slide or disc are all located upstream from an opening of the body portion defined by the valve seat.

3. The guided slide valve of claim 1, wherein the body portion comprises a cone having a cylindrical portion forming the projecting body portion.

4. The guided slide valve of claim 1, wherein the guides comprise parallel projections extending inward from the side members of the slide or disc.

5. The guided slide valve of claim 1, wherein the side members of the slide or disc are provided with grooves which form the guides interfitting with the side members of the projecting body portion.

6. A guided slide valve comprising: a body provided with a flow passage therethrough; a body portion connected at one end to the body and having a projecting body portion comprising side members having the entirety of its side members spaced from internal walls of the body thereby forming a transverse space on each side of the projecting body portion out of direct flow through the flow passage; a valve seat secured on the projecting body portion; a slide or disc slidable adjacent the valve seat and having side members forming guides extending around the sides members of the projecting body portion and disposed in the transverse space, the side members of the slide or disc being welded to a slide or disc body of the slide or disc; guides of the slide or disc and the side members of the projecting body portion being operable for guiding slide or the disc into open and closed positions adjacent the valve seat; the side members of the projecting body portion and the guides of the slide or disc being spaced from the internal walls of the body and out of the direct flow through the flow passage.

7. The guided slide valve of claim 6, wherein the transverse space, the guides, and side members of the projecting body portion are all located upstream from an opening of the body portion defined by the valve seat.

8. The guided slide valve of claim 6, wherein the body portion comprises a cone having a cylindrical portion forming the projecting body portion.

9. The guided slide valve of claim 6, wherein the guides comprise parallel projections extending inwardly from the side members of the slide or disc.

10. The guided slide valve of claim 6, wherein the side members of the slide or disc are provided with grooves which form the guides interfitting with the side members of the projecting body portion.

11. The guided slide valve of claim 6, wherein the body comprises an enlarged internal portion in which the transverse space is disposed.

12. The guided slide valve of claim 6, wherein the body comprises an opening of a size permitting insertion in and withdrawal from the body of the valve seat, the projecting body portion and its side members and the slide or disc therethrough.

13. The guided slide valve of claim 12, further comprising a removable cover closing the opening.

14. A guided slide valve comprising: a body provided with a flow passage therethrough; a body portion connected at one end to the body and having a projecting body portion comprising side members having the entirety of its side members spaced from internal walls of the body thereby forming a transverse space on each side of the projecting body portion out of direct flow through the flow passage, with valve guides disposed on the projecting body portion in each transverse space; a valve seat secured on the projecting body portion; a slide or disc slidable adjacent the valve seat and having spaced side members extending around the side members of the projecting body portion and forming slide guides disposed in the transverse space and interfitting with the valve guides, the side members of the slide or disc being welded to a body portion of the slide or disc; and the side members, valve guides and slide guides, being spaced from the internal walls of the body and out of the direct flow through the flow passage.

15. The guided slide valve of claim 14, wherein the transverse space, the valve guides, and slide guides are all located upstream from an opening of the body portion defined by the valve seat.

16. The guided slide valve of claim 14, wherein the body portion comprises a cone having a cylindrical portion forming the projecting body portion.

17. The guided slide valve of claim 14, wherein the valve guides comprise parallel projections extending from the sides of the projecting body portion.

18. The guided slide valve of claim 14, wherein the side members of the slide or disc are provided with grooves which form the slide guides interfitting with the valve guides.

19. The guided slide valve of claim 14, wherein the body comprises an enlarged internal portion in which the transverse space is disposed.

20. The guided slide valve of claim 14, wherein the body comprises: an opening of a size permitting insertion in and withdrawal from the body of the valve seat, the projecting body portion and its side members and the slide or disc therethrough; and a removable cover closing the opening.

* * * * *